United States Patent
Nakazawa et al.

(10) Patent No.: US 12,091,839 B2
(45) Date of Patent: Sep. 17, 2024

(54) SYSTEM AND METHOD FOR WORK MACHINE

(71) Applicant: KOMATSU LTD., Tokyo (JP)

(72) Inventors: Koichi Nakazawa, Tokyo (JP); Osamu Yatsuda, Tokyo (JP)

(73) Assignee: KOMATSU LTD., Tokyo (JP)

( * ) Notice: Subject to any disclaimer, the term of this patent is extended or adjusted under 35 U.S.C. 154(b) by 659 days.

(21) Appl. No.: 17/289,489

(22) PCT Filed: Jan. 20, 2020

(86) PCT No.: PCT/JP2020/001722
§ 371 (c)(1),
(2) Date: Apr. 28, 2021

(87) PCT Pub. No.: WO2020/153301
PCT Pub. Date: Jul. 30, 2020

(65) Prior Publication Data
US 2021/0388580 A1 Dec. 16, 2021

(30) Foreign Application Priority Data
Jan. 23, 2019 (JP) ................................. 2019-008904

(51) Int. Cl.
*E02F 9/26* (2006.01)
*B60R 1/27* (2022.01)
(Continued)

(52) U.S. Cl.
CPC ................ *E02F 9/261* (2013.01); *B60R 1/27* (2022.01); *E02F 9/264* (2013.01); *H04N 5/265* (2013.01);
(Continued)

(58) Field of Classification Search
CPC ......... E02F 9/261; E02F 9/264; E02F 9/2228; E02F 9/2278; E02F 3/841; B60R 1/27;
(Continued)

(56) References Cited

U.S. PATENT DOCUMENTS

| | | | |
|---|---|---|---|
| 2010/0066833 A1* | 3/2010 | Ohshima ................... | B60R 1/00 348/148 |
| 2013/0010119 A1* | 1/2013 | Mitsugi ..................... | B60R 1/00 348/148 |

(Continued)

FOREIGN PATENT DOCUMENTS

| | | | |
|---|---|---|---|
| EP | 3226553 A1 * | 10/2017 | ............... B60R 1/00 |
| EP | 3 385 458 A1 | 10/2018 | |

(Continued)

OTHER PUBLICATIONS

The International Search Report for the corresponding international application No. PCT/JP2020/001722, issued on Mar. 24, 2020.
(Continued)

*Primary Examiner* — Jonathan L Sample
*Assistant Examiner* — Sagar Kc
(74) *Attorney, Agent, or Firm* — Global IP Counselors, LLP

(57) ABSTRACT

A system includes a processor and a display. A work machine includes a vehicle body and a work implement attached to the vehicle body. A camera captures a surroundings image in a traveling direction of the work machine. The processor acquires image data indicative of the surroundings image. The processor synthesizes a guide display and the surroundings image and generates an image including the surroundings image and the guide display. The display displays the image including the surroundings image and the guide display based on a signal from the processor. The system may further include the work machine and the camera.

21 Claims, 9 Drawing Sheets

(51) Int. Cl.
*H04N 5/265* (2006.01)
*H04N 7/18* (2006.01)
*E02F 9/22* (2006.01)

(52) U.S. Cl.
CPC ........ *H04N 7/183* (2013.01); *B60R 2300/105* (2013.01); *B60R 2300/303* (2013.01); *E02F 9/2228* (2013.01); *E02F 9/2278* (2013.01)

(58) Field of Classification Search
CPC ........ B60R 2300/105; B60R 2300/303; B60R 2300/305; B60R 1/00; H04N 5/265; H04N 7/183; H04N 5/272
See application file for complete search history.

(56) References Cited

U.S. PATENT DOCUMENTS

| | | | |
|---|---|---|---|
| 2015/0217691 A1* | 8/2015 | Tanuki | E02F 9/261 348/148 |
| 2017/0037586 A1* | 2/2017 | Kröll | B60R 1/00 |
| 2017/0050566 A1* | 2/2017 | Yamashita | B60R 1/00 |
| 2017/0089042 A1* | 3/2017 | Machida | B60R 1/28 |
| 2018/0244201 A1 | 8/2018 | Tsukamoto et al. | |
| 2018/0370432 A1 | 12/2018 | Imaizumi et al. | |
| 2020/0399863 A1* | 12/2020 | Aizawa | G06Q 50/08 |
| 2021/0233290 A1* | 7/2021 | Shimazu | H04N 7/18 |

FOREIGN PATENT DOCUMENTS

| | | |
|---|---|---|
| JP | 2001-3488914 A | 12/2001 |
| JP | 2005-112267 A | 4/2005 |
| JP | 2013-142228 A | 7/2013 |
| JP | 2014-161087 A | 9/2014 |
| JP | 2016-10129 A | 1/2016 |
| WO | 2016/031009 A1 | 3/2016 |
| WO | 2018/146782 A1 | 8/2018 |

OTHER PUBLICATIONS

The Office Action for the corresponding Japanese application No. 2019-008904, issued on Nov. 15, 2022.

Examination report No. 1 for the corresponding Australian application No. 2020211863, dated Apr. 12, 2022.

* cited by examiner

SYSTEM AND METHOD FOR WORK MACHINE

CROSS-REFERENCE TO RELATED APPLICATIONS

This application is a U.S. National stage application of International Application No. PCT/JP2020/001722, filed on Jan. 20, 2020. This U.S. National stage application claims priority under 35 U.S.C. § 119(a) to Japanese Patent Application No. 2019-008904, filed in Japan on Jan. 23, 2019, the entire contents of which are hereby incorporated herein by reference.

BACKGROUND

Field of the Invention

The present disclosure relates to a system and a method for a work machine.

Background Information

A system which displays an image indicating a work machine and the surroundings of the work machine on a display is known in the prior art. For example, in International Publication No. WO 2016/031009, a system includes a plurality of cameras attached to a work machine, and a controller. The plurality of cameras capture images of the surroundings of the work machine. The controller synthesizes a bird's-eye view image which indicates the surroundings of the work machine from the images captured by the plurality of cameras.

SUMMARY

An operator is able to check the surroundings of the work machine by viewing the above image on the display. Work efficiency can be further improved if the operator is able to accurately ascertain the positional relationship between the work machine and the surroundings thereof at that time. For example, if the operator is able to accurately ascertain the positional relationship in the width direction between the work machine and a road in the surroundings of the work machine, the operator can easily determine whether the work machine can pass through the road.

An object of the present disclosure is to allow an operator to accurately ascertain a positional relationship between a work machine and the surroundings thereof with an image.

A system according to a first aspect includes a work machine, a camera, a processor, and a display. The work machine includes a vehicle body and a work implement attached to the vehicle body. The camera captures a surroundings image in the traveling direction of the work machine. The processor acquires image data which represents the surroundings image. The processor synthesizes a guide display and the surroundings image and generates an image that includes the surroundings image and the guide display. The guide display depicts an interval in the vehicle width direction of the work machine. The display displays the image which includes the surroundings image and the guide display based on a signal from the processor.

A method according to a second aspect is a method executed by a processor for displaying the surroundings of a work machine on a display. The work machine includes a vehicle body and a work implement attached to the vehicle body. The method includes the following processes. A first process is acquiring image data which represents a surroundings image in the traveling direction of the work machine. A second process is synthesizing a guide display and the surroundings image and generating an image that includes the surroundings image and the guide display. The guide display depicts an interval in the vehicle width direction of the work machine. A third process is displaying the image that includes the surroundings image and the guide display on a display based on a signal from the processor.

A method according to a third aspect is a method executed by a processor for displaying the surroundings of a work machine on a display. The work machine includes a vehicle body and a work implement attached to the vehicle body. The method includes the following processes. A first process is acquiring image data which represents a surroundings image in the traveling direction of the work machine. A second process is synthesizing a guide display and the surroundings image and generating an image that includes the surroundings image and the guide display. The guide display includes a pair of lateral guide lines. The pair of lateral guide lines extend forward or rearward at the side of the work machine. A third process is displaying the image that includes the surroundings image and the guide display on a display.

A system according to a fourth aspect includes a processor and a display. The processor acquires image data. The image data represents a surroundings image in the traveling direction of a work machine. The processor synthesizes a guide display and the surroundings image and generates an image that includes the surroundings image and the guide display. The guide display depicts an interval in the vehicle width direction of the work machine. The display displays the image which includes the surroundings image and the guide display based on a signal from the processor.

According to the present disclosure, an operator is able to accurately ascertain the positional relationship between a work machine and the surroundings thereof with an image.

DETAILED DESCRIPTION OF EMBODIMENT(S)

Figure 1:
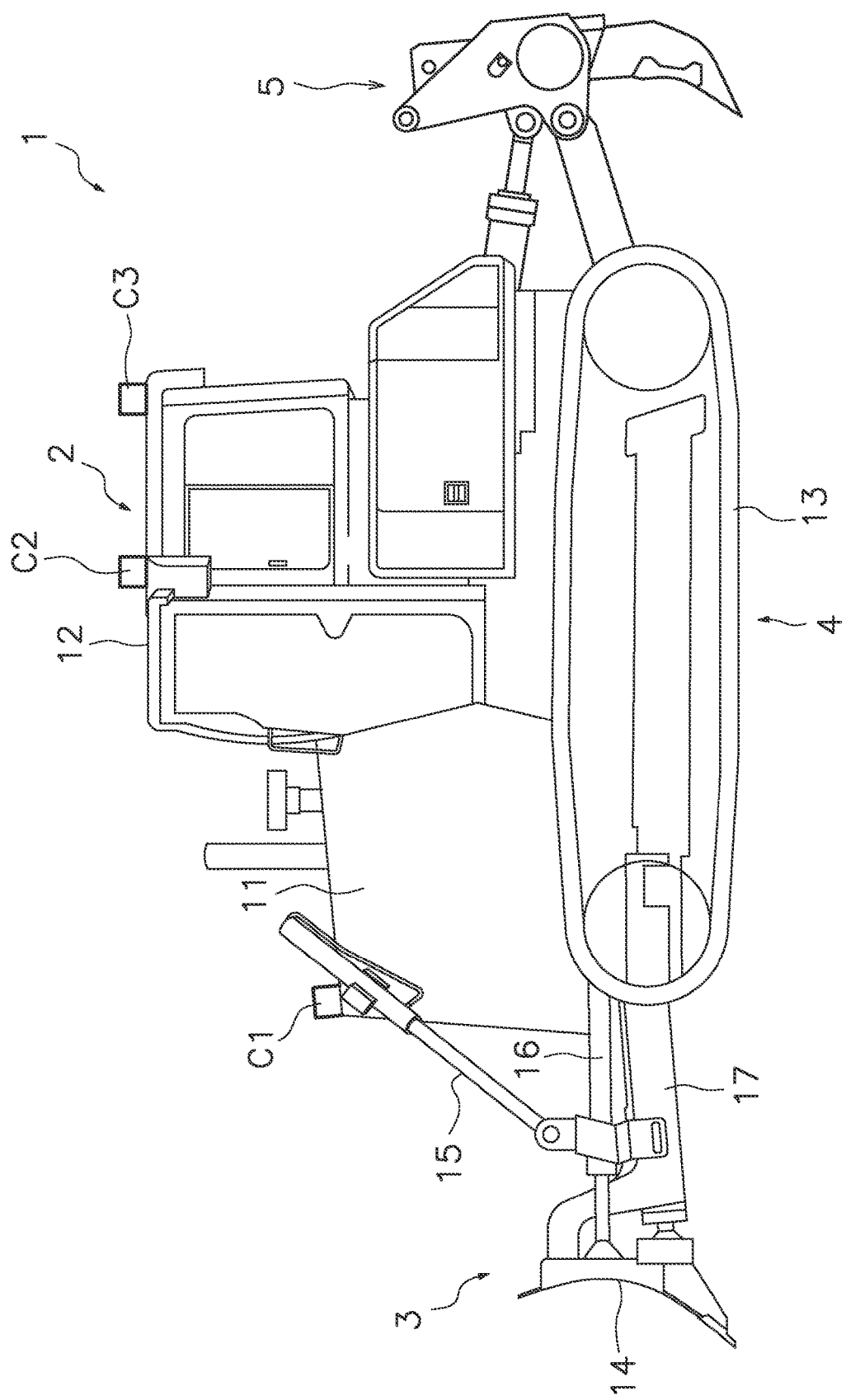
FIG. 1 is a side view of a work machine according to an embodiment.

The following is a description of a system for a work machine according to an embodiment with reference to the drawings. FIG. 1 is a side view of a work machine 1 according to the embodiment. The work machine 1 is a bulldozer according to the present embodiment. The work machine 1 is provided with a vehicle body 2, a work implement 3, and a travel device 4. In the following explanation, the direction in which the work implement 3 is disposed on the vehicle body 2 is defined as forward and the opposite direction is defined as rearward. The left and right are defined as the left and right directions when looking forward from the vehicle body 2.

The vehicle body 2 includes an engine compartment 11. An operating cabin 12 is disposed behind the engine compartment 11. A ripper device 5 is attached to a rear part of the vehicle body 2. The travel device 4 is a device for causing the work machine 1 to travel. The travel device 4 has a pair of crawler belts 13. The crawler belts 13 are disposed on the left and right sides of the vehicle body 2. The work machine 1 travels due to the crawler belts 13 being driven.

The work implement 3 is disposed in front of the vehicle body 2. The work implement 3 is used for work such as excavating, earth moving, or ground leveling. The work implement 3 has a blade 14, a lift cylinder 15, a tilt cylinder 16, and an arm 17. The blade 14 is attached to the vehicle body 2 via the arm 17. The blade 14 is configured to move in the up-down direction. The lift cylinder 15 and the tilt cylinder 16 are driven by hydraulic fluid discharged from a belowmentioned hydraulic pump 22 and change the attitude of the blade 14.

Figure 2:
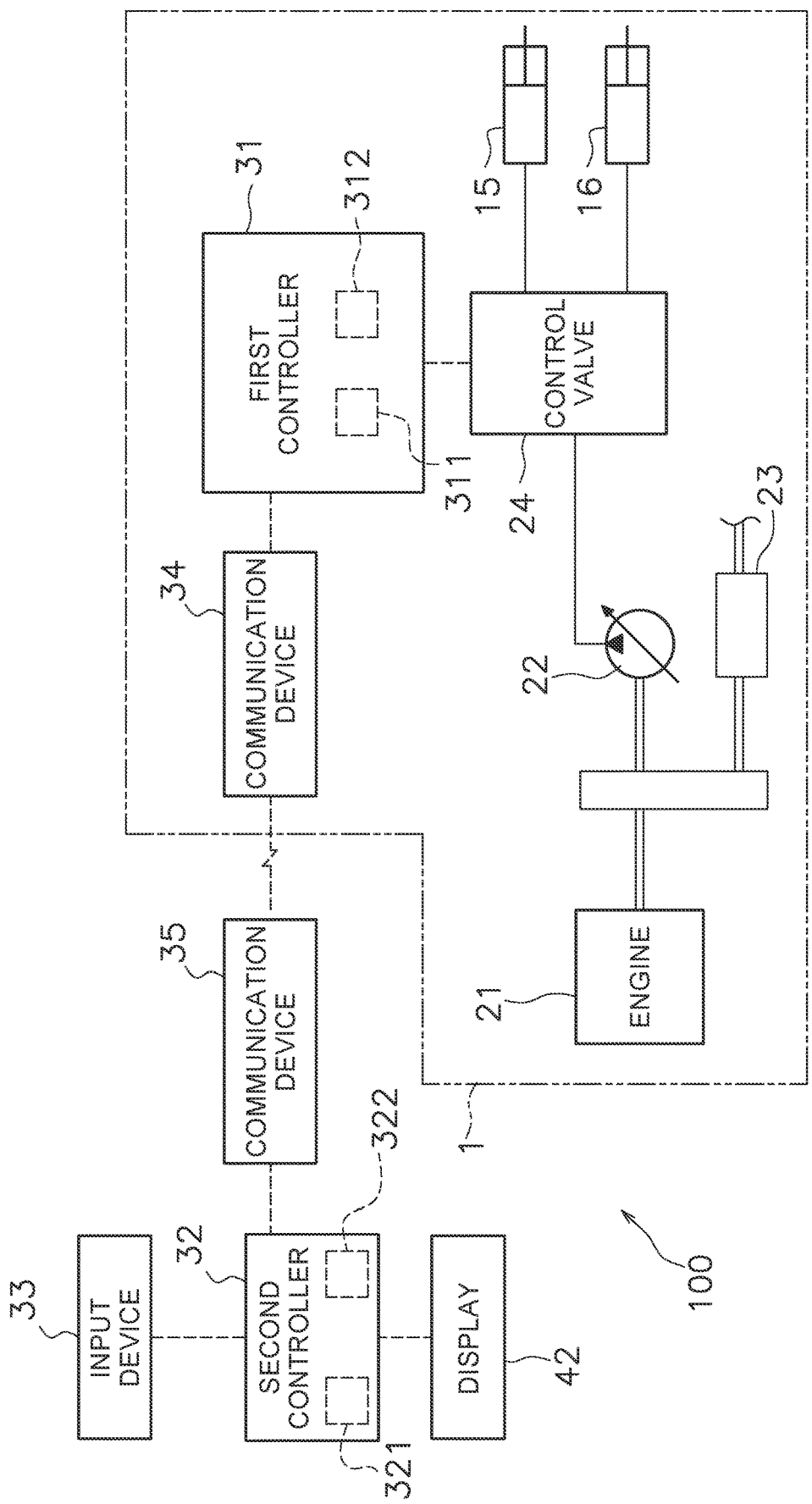
FIG. 2 illustrates a configuration of a system according to the embodiment.

FIG. 2 is a block diagram of a configuration of a system 100 for controlling the work machine 1. As illustrated in FIG. 2, the work machine 1 includes an engine 21, the hydraulic pump 22, a power transmission device 23, and a control valve 24. The engine 21, the hydraulic pump 22, and the power transmission device 23 are disposed in the engine compartment 11. The hydraulic pump 22 is driven by the engine 21 to discharge hydraulic fluid. The hydraulic fluid discharged from the hydraulic pump 22 is supplied to the lift cylinder 15 and the tilt cylinder 16. While only one hydraulic pump 22 is illustrated in FIG. 2, a plurality of hydraulic pumps may be provided.

The power transmission device 23 transmits the driving power of the engine 21 to the travel device 4. The power transmission device 23 may be a hydrostatic transmission (HST), for example. Alternatively, the power transmission device 23 may be, for example, a transmission having a torque converter or a plurality of speed change gears.

The control valve 24 is a proportional control valve and is controlled in accordance with an input instruction signal. The control valve 29 is disposed between hydraulic actuators and the hydraulic pump 22. The hydraulic actuators include the lift cylinder 15 and the tilt cylinder 16. The control valve 24 controls the flow rate of the hydraulic fluid supplied from the hydraulic pump 22 to the lift cylinder 15 and the tilt cylinder 16. The control valve 24 may also be a pressure proportional control valve. Alternatively, the control valve 24 may be an electromagnetic proportional control valve.

The system 100 includes a first controller 31, a second controller 32, an input device 33, and communication devices 34 and 35. The first controller 31 and the communication device 34 are mounted to the work machine 1. The second controller 32, the input device 33, and the communication device 35 are disposed outside of the work machine 1. For example, the second controller 32, the input device 33, and the communication device 35 may be disposed inside a control center separate from the work site. The work machine 1 can be operated remotely through the input device 33.

The first controller 31 and the second controller 32 are programmed to control the work machine 1. The controller 31 includes a memory 311 and a processor 312. The memory 311 includes, for example, a volatile memory such as a RAM and a non-volatile memory such as a ROM. The memory 311 stores programs and data for controlling the work machine 1. The processor 312 is, for example, a central processing unit (CPU) and executes processes for controlling the work machine 1 according to a program. The first controller 31 controls the travel device 4 or the power transmission device 23 thereby causing the work machine 1 to travel. The first controller 31 causes the work implement 3 to move by controlling the control valve 24.

The second controller 32 includes a memory 321 and a processor 322. The memory 321 includes, for example, a volatile memory such as a RAM and a non-volatile memory such as a ROM. The memory 321 stores programs and data for controlling the work machine 1. The processor 322 is, for example, a central processing unit (CPU) and executes processes for controlling the work machine 1 according to a program. The second controller 32 receives operation signals from the input device 33.

The input device 33 receives operations by an operator and outputs the operation signals corresponding to the operations. The input device 33 outputs the operation signals to the second controller 32. The input device 33 includes operation pieces such as an operating lever, a pedal, or a switch for operating the travel device 4 and the work implement 3. The input device 33 may include a touch panel. The travel of the work machine 1 such as forward travel or reverse travel is controlled in accordance with the operation of the input device 33. In addition, operation of the work implement 3 such as raising or lowering is controlled in accordance with the operation of the input device 33.

The second controller 32 is configured to communicate wirelessly with the first controller 31 via the communication devices 34 and 35. The second controller 32 acquires operation data from the operation signals from the input device 33 and transmits the operation data to the first controller 31. The operation data represents operations of the input device 33 for operating the travel device 4 and the work implement 3. The first controller 31 controls the travel device 4 and the work implement 3 in accordance with the operation data.

Figure 3:
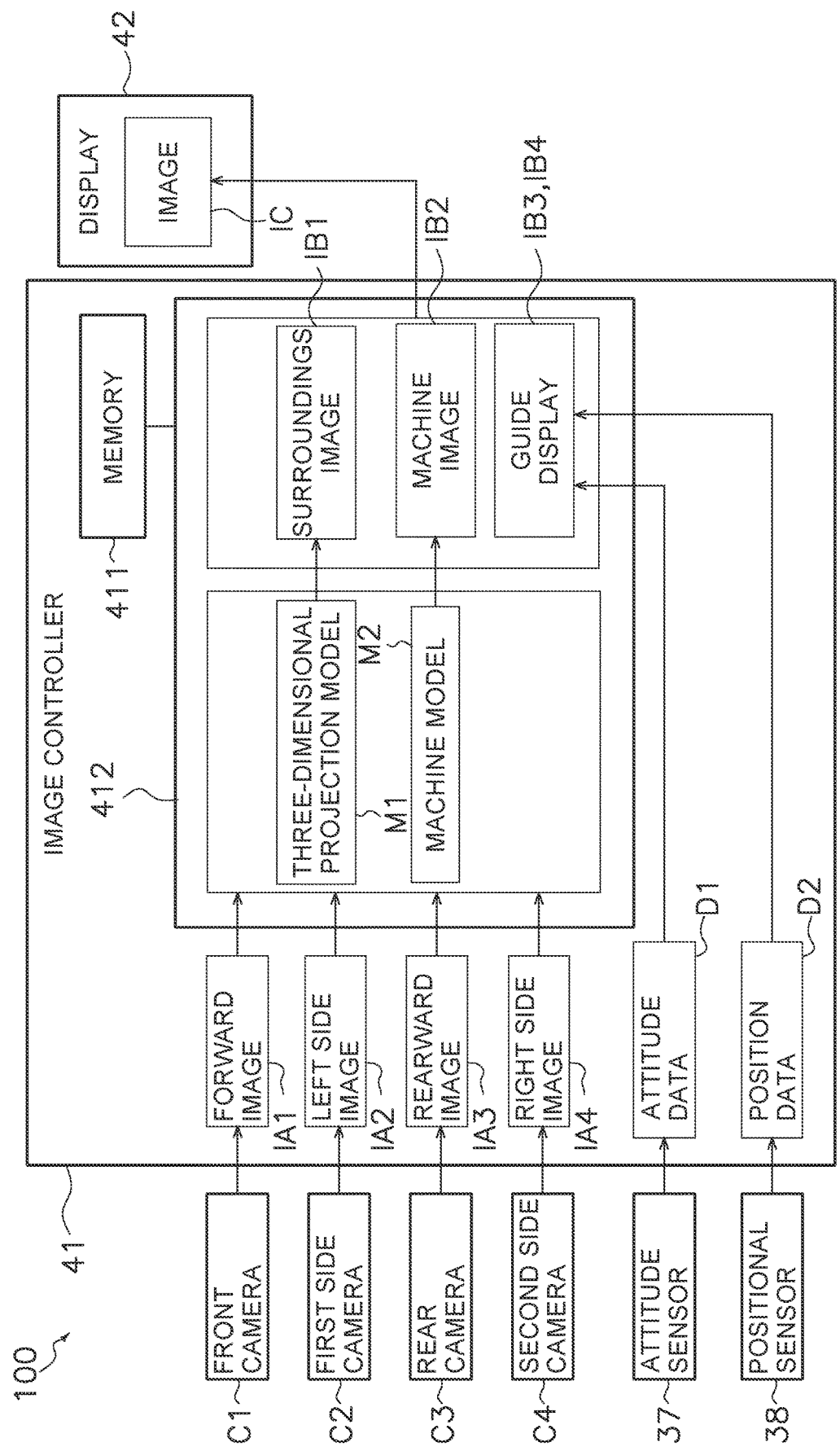
FIG. 3 is a block diagram illustrating a configuration of the system and a processing flow performed by the system.

FIG. 3 is a block diagram illustrating a configuration of the system 100 for displaying an image of the work machine 1 and the surroundings thereof, and illustrating a processing flow performed by the system. As illustrated in FIG. 3, the system 100 includes a plurality of cameras C1 to C4. The plurality of cameras C1 to C4 are attached to the vehicle body 2.

The plurality of cameras C1 to C4 are fish-eye lens cameras. The angle of view of each of the plurality of cameras C1 to C4 is 180 degrees. However, the angle of view of each of the plurality of cameras C1 to C4 may be less than 180 degrees. Alternatively, the angle of view of each of the plurality of cameras C1 to C4 may be greater than 180 degrees. The plurality of cameras C1 to C4 includes a front camera C1, a first side camera C2, a rear camera C3, and a second side camera C4.

As illustrated in FIG. 1, the front camera C1 is attached to a front part of the vehicle body 2. The rear camera C3 is attached to a rear part of the vehicle body 2.

The first side camera C2 is attached to one side part of the vehicle body 2. The second side camera C4 is attached to the other side part of the vehicle body 2. In the present embodiment, the first side camera C2 is attached to a left side part of the vehicle body 2 and the second side camera C4 is attached to a right side part of the vehicle body 2. However, the first side camera C2 may be attached a right side part of the vehicle body 2, and the second side camera C4 may be attached a left side part of the vehicle body 2.

The front camera C1 acquires images in front of the vehicle body 2. The rear camera C3 acquires images to the rear of the work machine 1. The first side camera C2 acquires images on the left side of the vehicle body 2. The second side camera C4 acquires images on the right side of the vehicle body 2. The cameras C1 to C4 output image data which represents the acquired images.

The system 100 includes an attitude sensor 37 and a positional sensor 38. The attitude sensor 37 detects the attitude of the work machine 1 and outputs attitude data D1 which represents the attitude. The attitude sensor 37 is, for example, an inertial measurement unit (IMU). The attitude data D1 includes the angle (pitch angle) relative to horizontal in the vehicle front-back direction and the angle (roll angle) relative to horizontal in the vehicle lateral direction. The attitude sensor 37 outputs the attitude data D1.

The positional sensor 38 includes, for example, a global navigation satellite system (GNSS) receiver such as a global positioning system (GPS) or the like. The positional sensor 38 receives positioning signals from a satellite. The positional sensor 38 acquires position data D2 from the positioning signal. The position data D2 represents the positional coordinates of the work machine 1. The positional sensor 38 outputs the position data D2.

The system 100 includes an image controller 41 and a display 42. The image controller 41 is programmed to generate an image IC which depicts the work machine 1 and the surroundings thereof and to display the image IC on the display 42. The image controller 41 includes a memory 411 and a processor 412. The memory 411 includes, for example, a volatile memory such as a RAM and a non-volatile memory such as a ROM. The memory 411 stores programs and data for generating the image IC. The processor 412 is a central processing unit (CPU) for example. The processor 412 executes processes for generating the image IC and displaying the image IC on the display 42 in accordance with a program.

The image controller 41 is communicably connected to the first controller 31 by wire or wirelessly. The image controller 41 is communicably connected to the second controller 32 by wire or wirelessly. The image controller 41 may be mounted on the work machine 1. The image controller 41 may be integrated with the first controller 31 or may be a separate item.

Alternatively, the image controller 41 may be disposed outside the work machine 1. For example, the image controller 41 may be disposed inside the control center. The image controller 41 may be integrated with the second controller 32 or may be a separate item.

The image controller 41 is communicably connected to the cameras C1 to C4 by wire or wirelessly. The image controller 41 receives the image data from the cameras C1 to C4. Alternatively, the image controller 41 may receive the image data through the first controller 31 and/or the second controller 32.

The image controller 41 is communicably connected to the attitude sensor 37 and the positional sensor 38 by wire or wirelessly. The image controller 41 receives the attitude data D1 from the attitude sensor 37. The image controller 41 receives the position data D2 from the positional sensor 38. Alternatively, the image controller 41 may receive the attitude data D1 and the position data D2 through the first controller 31 and/or the second controller 32.

The display 142 is a device such as a CRT, and LCD, or an OELD. However, the display 42 is not limited to the aforementioned displays and may be another type of display. The display 42 displays images based on signals from the image controller 41. The display 42 may receive the signals from the image controller 41 through the first controller 31 and/or the second controller 32.

Figure 4:
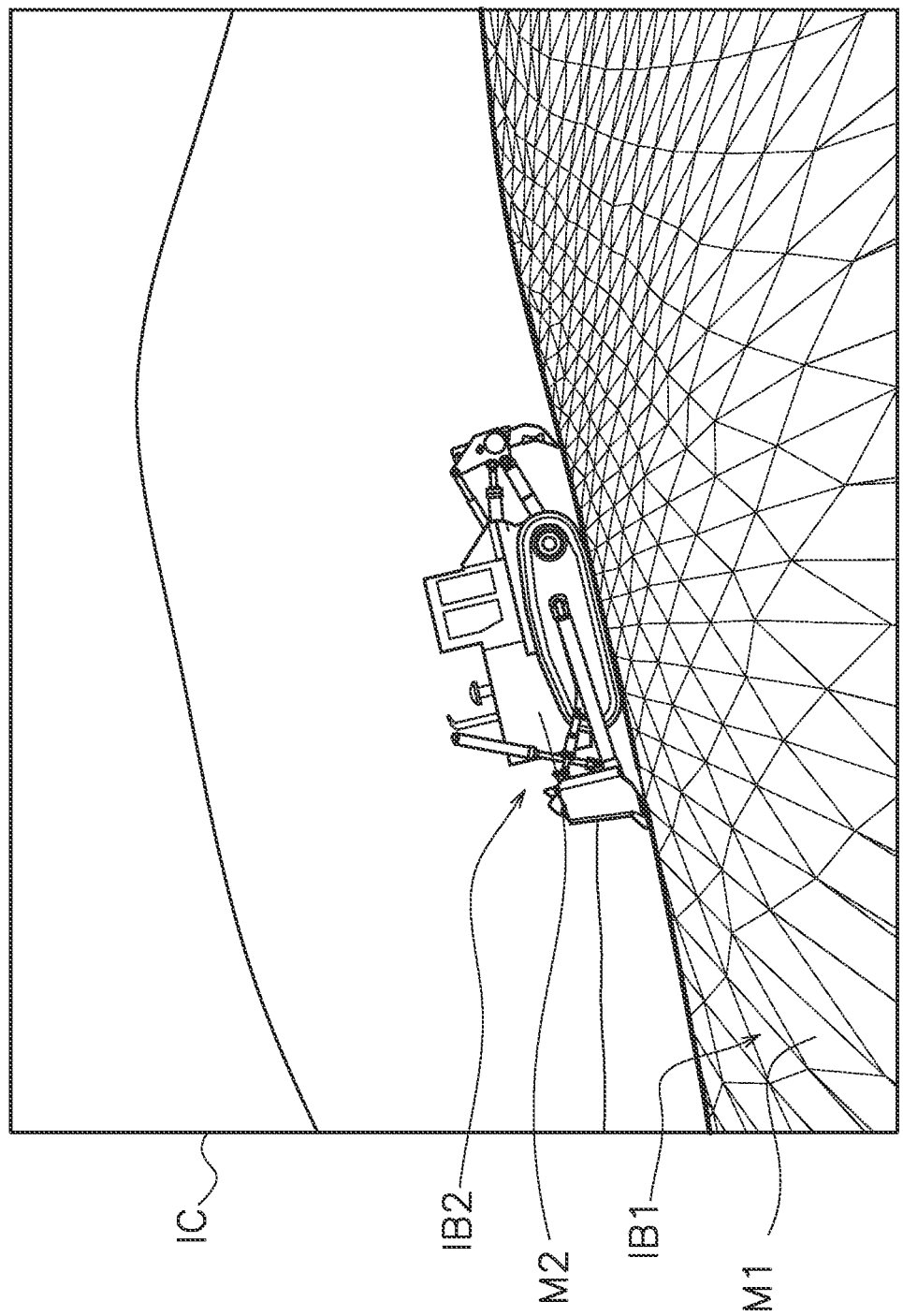
FIG. 4 illustrates an example of an image displayed on a display.

The image controller 41 generates the image IC based on the abovementioned image data, the attitude data D1, and the position data D2. FIG. 4 illustrates an example of the image IC. The image IC includes the work machine 1 and the surroundings thereof. The following is an explanation of the generation of the image IC.

First, the cameras C1 to C4 capture images of the work machine 1 and the surroundings thereof. Consequently, the image controller 41 acquires a forward image IA1, a left side image IA2, a rearward image IA3, and a right side image IA4 from the cameras C1 to C4 as illustrated in FIG. 3. The forward image IA1 is an image in front of the vehicle body 2. The left side image IA2 is an image to the left of the vehicle body 2. The rearward image IA3 is an image behind the vehicle body 2. The right side image IA4 is an image to the right of the vehicle body 2.

The image controller 41 generates a surroundings image IB1 from the images IA1 to IA4 acquired by the cameras C1 to C4. The surroundings image IB1 is a composite image which represents the surroundings of the work machine 1 from a bird's-eye view. The image controller 41 generates the surroundings image IB1 by projecting the images IA1 to IA4 acquired by the cameras C1 to C4 onto a three-dimensional projection model M1 by texture mapping as illustrated in FIG. 4. The three-dimensional projection model M1 is configured with a polygon mesh which represents the shape of surroundings of the work machine 1. The image controller 41 may use a previously saved three-dimensional projection model M1. Alternatively, the image controller 41 may measure the surroundings of the work machine 1 with a measurement device such as a light detection and ranging (LIDAR) device to generate the three-dimensional projection model M1.

Next, the image controller 41 synthesizes a machine image IB2, which depicts the work machine 1, with the surroundings image IB1. The machine image IB2 is an image which depicts the work machine 1 itself in a three-dimensional manner. The image controller 41 determines the attitude and heading of the machine image IB2 on the image IC from the attitude data D1. The image controller 41 determines the position of the machine image IB2 on the image IC from the position data D2. The image controller 41 synthesizes the machine image IB2 with the image IC so that the attitude, heading, and position of the machine image IB2 on the image IC matches the actual attitude, heading, and position of the work machine 1.

The image controller 41 may generate the machine image IB2 from the images IA1 to IA4 acquired by the cameras C1 to C4. For example, portions of the work machine 1 are included in the images acquired by the cameras C1 to C4, and the image controller 41 may generate the machine image IB2 by projecting the portions in the images onto a machine model M2. Alternatively, the machine model M2 may be a projection model having the shape of the work machine 1 and may be saved in the memory 411. The machine image IB2 may be a previously captured image or may be a previously created three-dimensional computer graphic.

The display 42 displays the image IC. The image IC is updated in real time and displayed as a video on the display 42. Therefore, when the work machine 1 is traveling, the surroundings image IB1 in the image IC are changed and displayed in real time in accordance with the actual changes of the surroundings of the work machine 1. Moreover, when the work machine 1 is traveling, the attitude, heading, and position of the machine image IB2 are changed and displayed in real time in accordance with the actual changes in the attitude, heading and position of the work machine 1.

With regard to a specific method for synthesizing the image IC, for example, the method described in "Spatio-temporal bird's-eye view images using multiple fish-eye cameras" (Proceedings of the 2013 IEEE/SICE International Symposium on System Integration, pp. 753-758, 2013) or the method described in "Visualization of the surrounding environment and operational part in a 3DCG model for the teleoperation of construction machines" (Proceedings of the 2015 IEEE/SICE International Symposium on System Integration, pp. 81-87, 2015) may be used.

In FIG. 4, the image IC is an image of the work machine 1 and the surroundings thereof as seen from the left side. However, the image controller 41 is configured to switch the image IC to an image of the work machine 1 and the surroundings thereof as seen from a viewpoint in front, in the rear, on the right side, or above, or from an oblique viewpoint from any of the directions.

Figure 5:
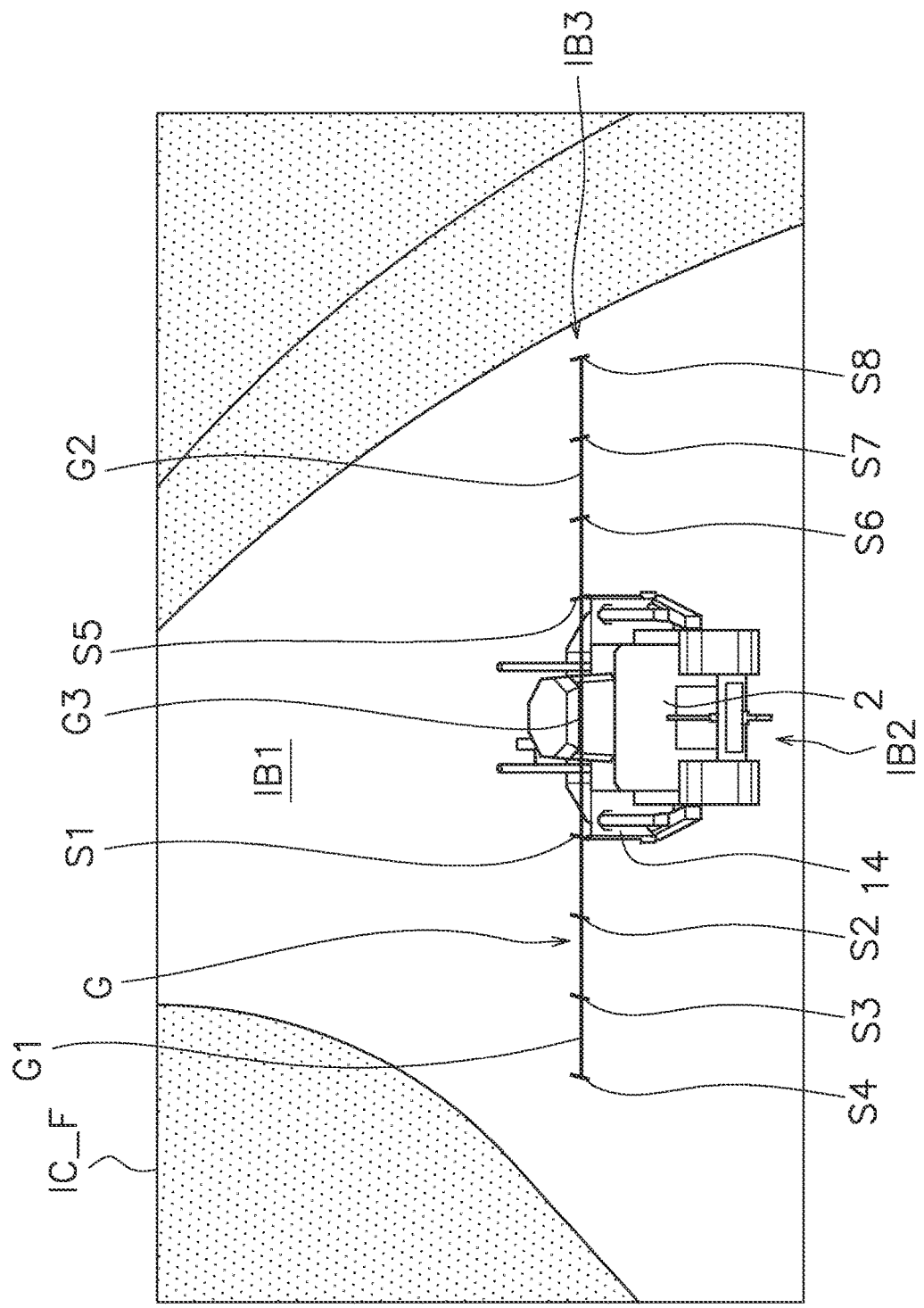
FIG. 5 illustrates an example of an image during forward travel.

During the forward travel of the work machine 1, the image controller 41 generates an image IC_F illustrated in FIG. 5 and causes the image IC_F to be displayed on the display 42. The image IC_F during forward travel illustrated in FIG. 5 is an image from a viewpoint behind and above the work machine 1. The image IC_F during forward travel depicts the entirety of the work machine 1 and the surroundings of the work machine 1. The image controller 41 determines the viewpoint and the position of the work machine 1 so that the area in front of the work machine 1 is larger than the area behind the image IC_F during forward travel.

The image IC_F during forward travel also includes a guide display IB3. The image controller 41 synthesizes the guide display IB3 and the abovementioned surroundings image IB1 and the machine image IB2, to generate the image IC. The guide display IB3 depicts intervals in the vehicle width direction of the work machine 1. Specifically the guide display IB3 depicts intervals in the vehicle width direction of the blade 14. However, the guide display IB3 may depict intervals in the vehicle width direction of the vehicle body 2.

The image controller 41 displays the guide display IB3 in the image IC in accordance with the attitude of the work machine 1. Specifically, the image controller 41 calculates the position and attitude of the blade 14 from the attitude data D1 and the position data D2. The image controller 41 displays the guide display IB3 at a position on the blade 14 in the image IC. However, the image controller 41 may display the guide display IB3 at a position forward of the blade 14.

The guide display IB3 includes a vehicle width guide line G and gradations S1 to S8. The vehicle width guide line G is a straight line that extends in the vehicle width direction of the work machine 1. The vehicle width guide line G includes a left guide line G1, a right guide line G2, and a center guide line G3. The left guide line G1 extends leftward from the left edge of the blade 14. The right guide line G1 extends rightward from the right edge of the blade 14. The center guide line G3 is positioned between the left guide line G1 and the right guide line G2. The center guide line G3 extends between the left edge and the right edge of the blade 14.

The gradations S1 to S8 are applied in predetermined intervals along the vehicle width guide line G. The gradations S1 to S4 are applied in predetermined intervals along the left guide line G1. The gradation S1 indicates the position of the left edge of the blade 14. The gradations S5 to S8 are applied in predetermined intervals along the right guide line G2. The gradation S5 indicates the position of the right edge of the blade 14. The predetermined interval is, for example, 1 m or 1 ft. However, the predetermined interval may be a numerical value different from 1 m or 1 ft. Alternatively, the predetermined interval may be the width of the blade 14 or the width of the vehicle body 2. Alternatively, the operator may be able to select the predetermined interval with the input device 33.

Figure 6:
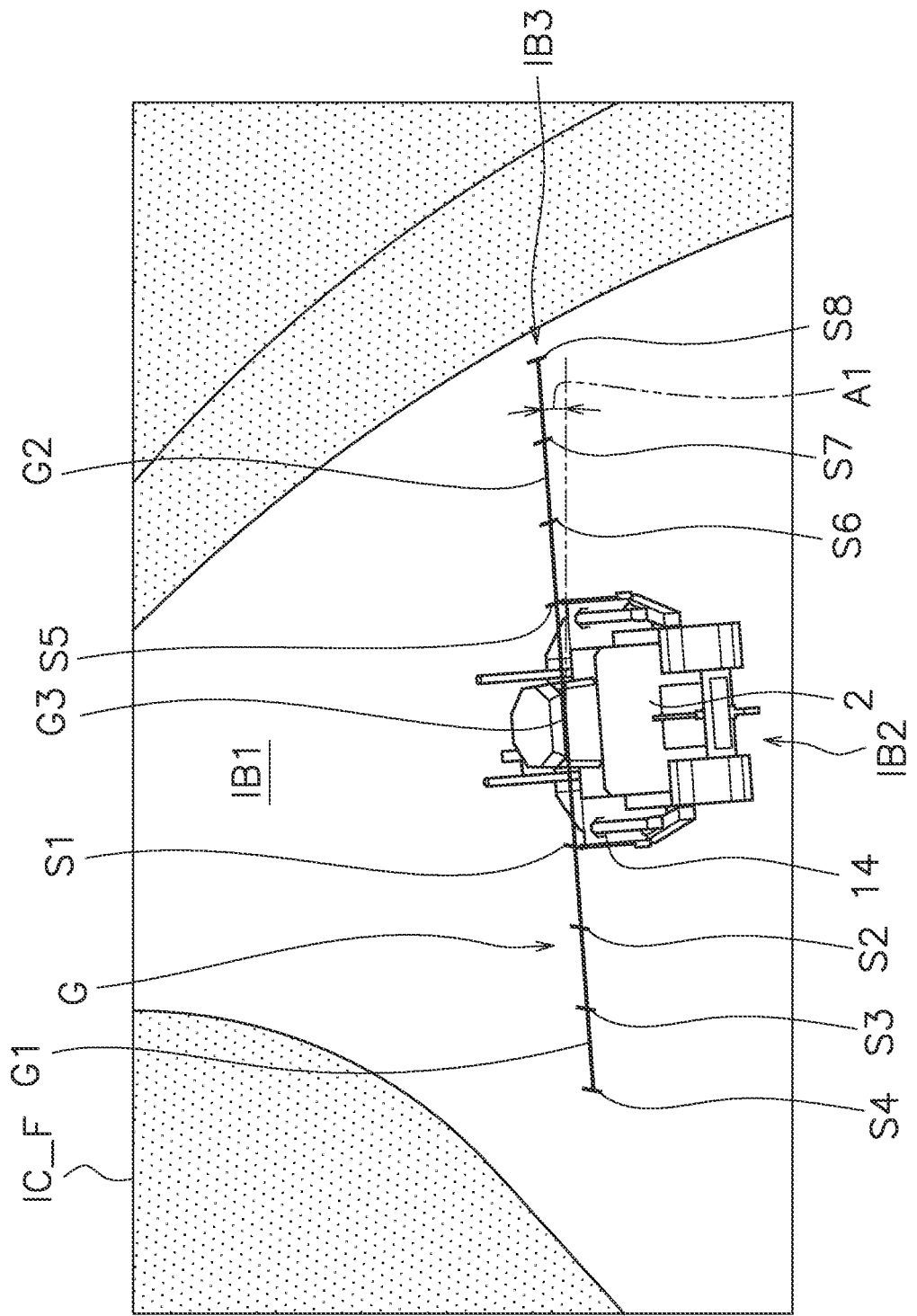
FIG. 6 illustrates another example of an image during forward travel.

As indicated above, the image controller 41 displays the guide display IB3 in the image IC_F in accordance with the attitude of the work machine 1. For example, when the work machine 1 is rolling to the left and right, the image controller 41 displays the guide display IB3 in the image IC_F at an angle in accordance with a roll angle A1 as illustrated in FIG. 6. That is, the guide display IB3 is displayed in the image IC while tilted by the roll angle A1 with the machine image IB2.

Figure 7:
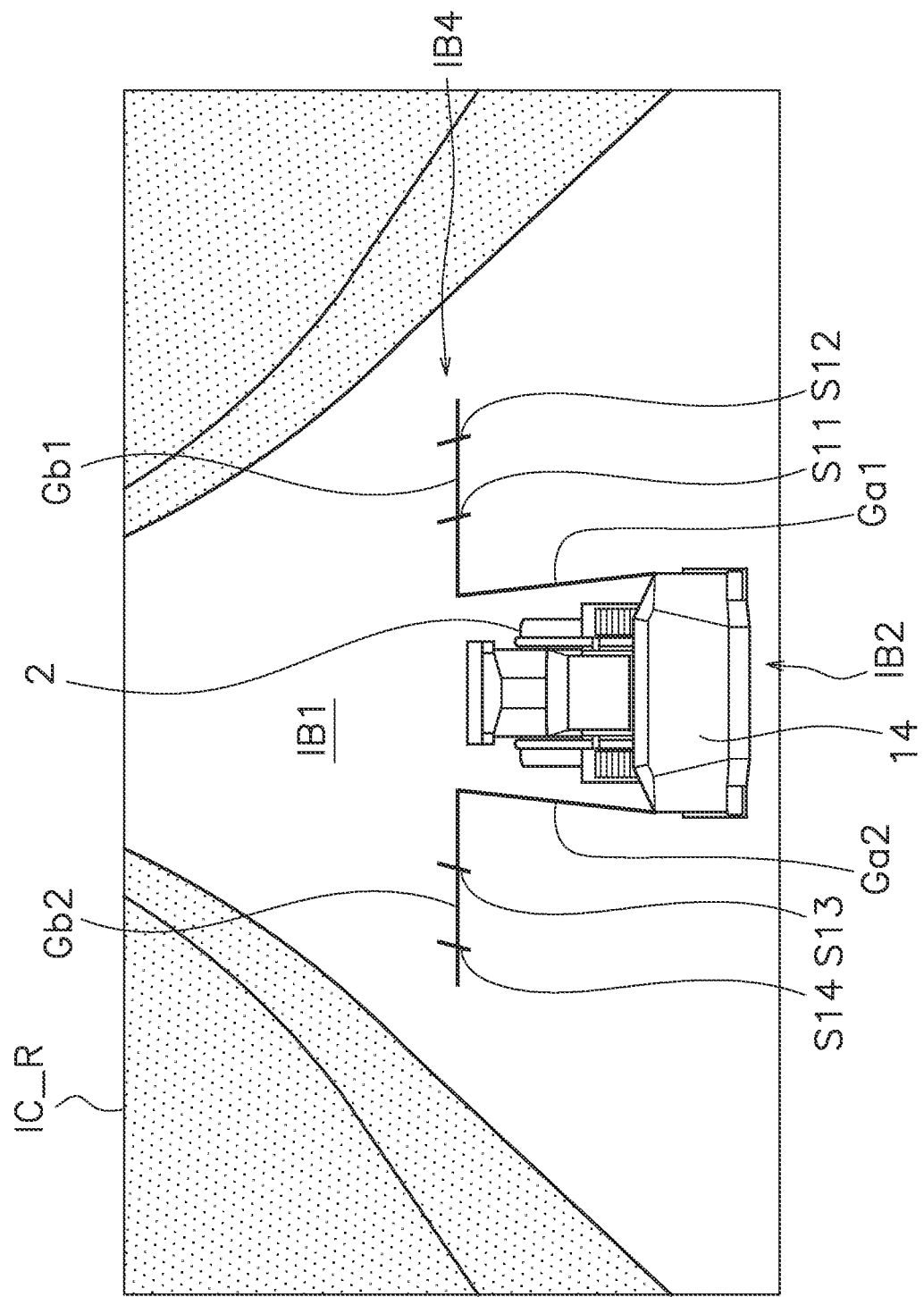
FIG. 7 illustrates an example of an image during reverse travel.

During reverse travel of the work machine 1, the image controller 41 generates an image IC_R illustrated in FIG. 7 and causes the image IC_R to be displayed on the display 42. The image IC_R during reverse travel illustrated in FIG. 7 is an image from a viewpoint in front of and above the work machine 1. The image IC_R during reverse travel depicts the entirety of the work machine 1 and the surroundings of the work machine 1. The image controller 41 determines the viewpoint and the position of the work machine 1 so that the area behind the work machine 1 is larger than the area in front of the work machine 1 in the image IC_R during reverse travel.

The image IC_R during reverse travel includes a guide display IB4. The image controller 41 synthesizes the guide display IB4 and the abovementioned surroundings image IB1 and the machine image IB2, to generate the image IC_R. The guide display IB4 depicts intervals in the vehicle width direction of the work machine 1. Specifically, the guide display IB4 depicts intervals in the vehicle width direction of the blade 14. However, the guide display IB4 may depict intervals in the vehicle width direction of the vehicle body 2.

The guide display IB4 includes lateral guide lines Ga1 and Ga2, vehicle width guide lines Gb1 and Gb2, and gradations S1 to S14. The lateral guide lines G1 and Ga2 are straight lines that extend rearward at the sides of the work machine 1. The lateral guide lines Ga1 and Ga2 include a left lateral guide line Ga1 and a right lateral guide line Ga2. The left lateral guide line Ga1 extends rearward from the left edge of the blade 14. The right lateral guide line Ga2 extends rearward from the right edge of the blade 14.

The vehicle width guide lines Gb1 and Gb2 are straight lines that extend in the vehicle width direction of the work machine 1. The vehicle width guide lines Gb1 and Gb2 include the left vehicle width guide line Gb1 and the right vehicle width guide line Gb2. The left vehicle width guide line Gb1 extends leftward from the left lateral guide line Ga1. The right vehicle width guide line Gb2 extends rightward from the right lateral guide line Ga2. Specifically, the left vehicle width guide line Gb1 extends leftward from the rear edge of the left lateral guide line Ga1. The right vehicle width guide line Gb2 extends rightward from the rear edge of the right lateral guide line Ga2. The left lateral guide line Ga1 and the left vehicle width guide line Gb1 have a shape that is bent as an L-shape or a reverse L-shape. The right lateral guide line Ga2 and the right vehicle width guide line Gb2 have a shape that is bent as an L-shape or a reverse L-shape.

The gradations S11 and S12 are applied in predetermined intervals along the left vehicle width guide line Gb1. The gradations S11 and S12 are applied in predetermined intervals along the right vehicle width guide line Gb2. The predetermined intervals are the same as those in the image IC_F during forward travel. Moreover, the image controller 41 also displays the guide display IB4 in accordance with the attitude of the work machine 1 in the image IC_R during reverse travel in the same way as in the image IC_F during forward travel.

In the system 100 according to the present embodiment as explained above, the guide displays IB3 and IB4 which depict intervals in the vehicle width direction of the work machine 1 are respectively displayed in the images IC_F and IC_R. As a result, the operator is able to accurately ascertain the positional relationship between the work machine 1 and the surroundings thereof. Accordingly, work efficiency can be improved.

The guide display IB3 is displayed in the image IC_F during forward travel. The guide display IB4 is displayed in the image IC_R during reverse travel. As a result, the operator is able to accurately ascertain the positional relationship between the work machine 1 and the surroundings thereof during the travel of the work machine 1. Consequently, the operator is able to easily operate the travel of the work machine 1.

The guide displays IB3 and IB4 are respectively displayed in the images IC_F and IC_R in accordance with the attitude of the work machine 1. As a result, the operator is able to accurately ascertain the positional relationship between the work machine 1 and the surroundings thereof even when the work machine 1 is traveling while the amount of roll is large.

The guide display IB3 includes the vehicle width guide line G and the gradations S1 to S8. The guide display IB4 includes the vehicle width guide lines Gb1 and Gb2 and the gradations S11 to S14. As a result, the operator is able to accurately ascertain the positional relationship between the work machine 1 and the surroundings thereof with respect to the blade 14.

The image IC_R during reverse travel includes the lateral guide lines Ga1 and Ga2. As a result, the operator is able to accurately ascertain the positional relationship between the work machine 1 and the surroundings thereof with respect to the blade 14 even in a position behind the work machine 1 that is spaced away from the blade 14.

While an embodiment of the present disclosure has been described above, the present invention is not limited to the embodiment and the following modifications may be made within the scope of the present invention. For example, the work machine is not limited to a bulldozer and may be another type of work machine such as a wheel loader or a hydraulic excavator.

Figure 8:
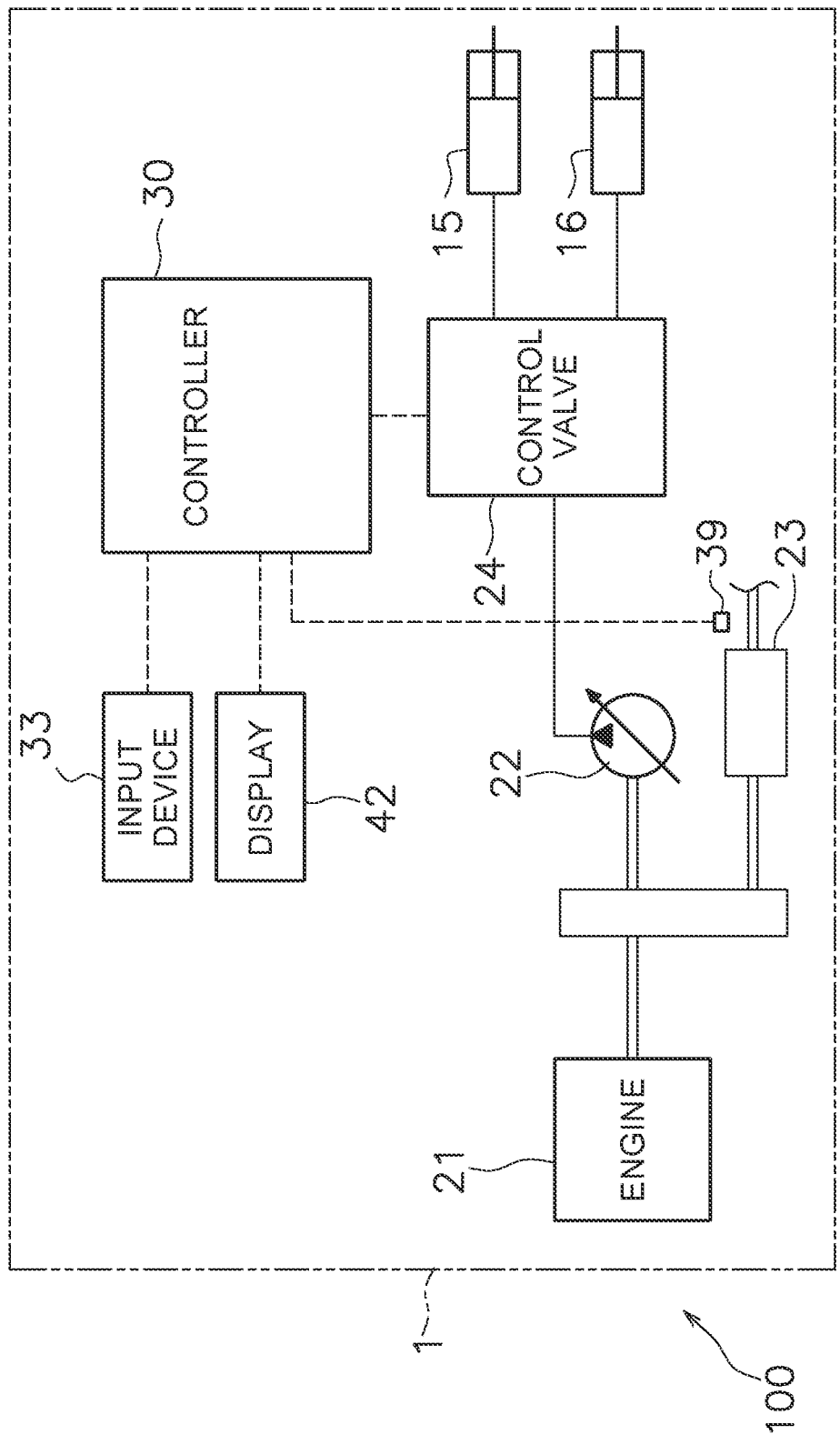
FIG. 8 illustrates a configuration of the system according to a modified example.

The work machine 1 may be operated from inside the operating cabin and not remotely. FIG. 8 illustrates a configuration of the work machine 1 according to a modified example. As illustrated in FIG. 8 the work machine 1 may include a controller 30 mounted to the work machine 1. The controller 30 has the same configuration as the abovementioned first controller 31 or the second controller 32 and therefore a detailed explanation will be omitted. In this case, the input device 33 may be disposed inside the operating cabin.

The first controller 31 is not limited to one unit and may be divided into a plurality of controllers. The second controller 32 is not limited to one unit and may be divided into a plurality of controllers. The controller 30 is not limited to one unit and may be divided into a plurality of controllers. A portion or all of the abovementioned processes for generating the images IC may be executed by another controller instead of the image controller 41.

The number of the cameras is not limited to four and may be three or less or five or more. The cameras are not limited to fish-eye lens cameras and may be a different type of camera. The dispositions of the cameras are not limited to the dispositions indicated in the above embodiment and may be disposed differently. The attitude sensor 37 is not limited to an IMU and may be another type of sensor. The positional sensor 38 is not limited to a GNSS receiver and may be another type of sensor.

The image during forward travel or the image during reverse travel may be an image from a viewpoint different from the abovementioned viewpoints. The guide display is not limited to a straight line and may be another shape such as dots. The number of gradations on the guide display is not limited to the above embodiment and may be modified. The guide display may be displayed in only one of the image during forward travel and the image during reverse travel. Alternatively, the guide display may be displayed in an image other than the image during forward travel or the image during reverse travel.

Figure 9:
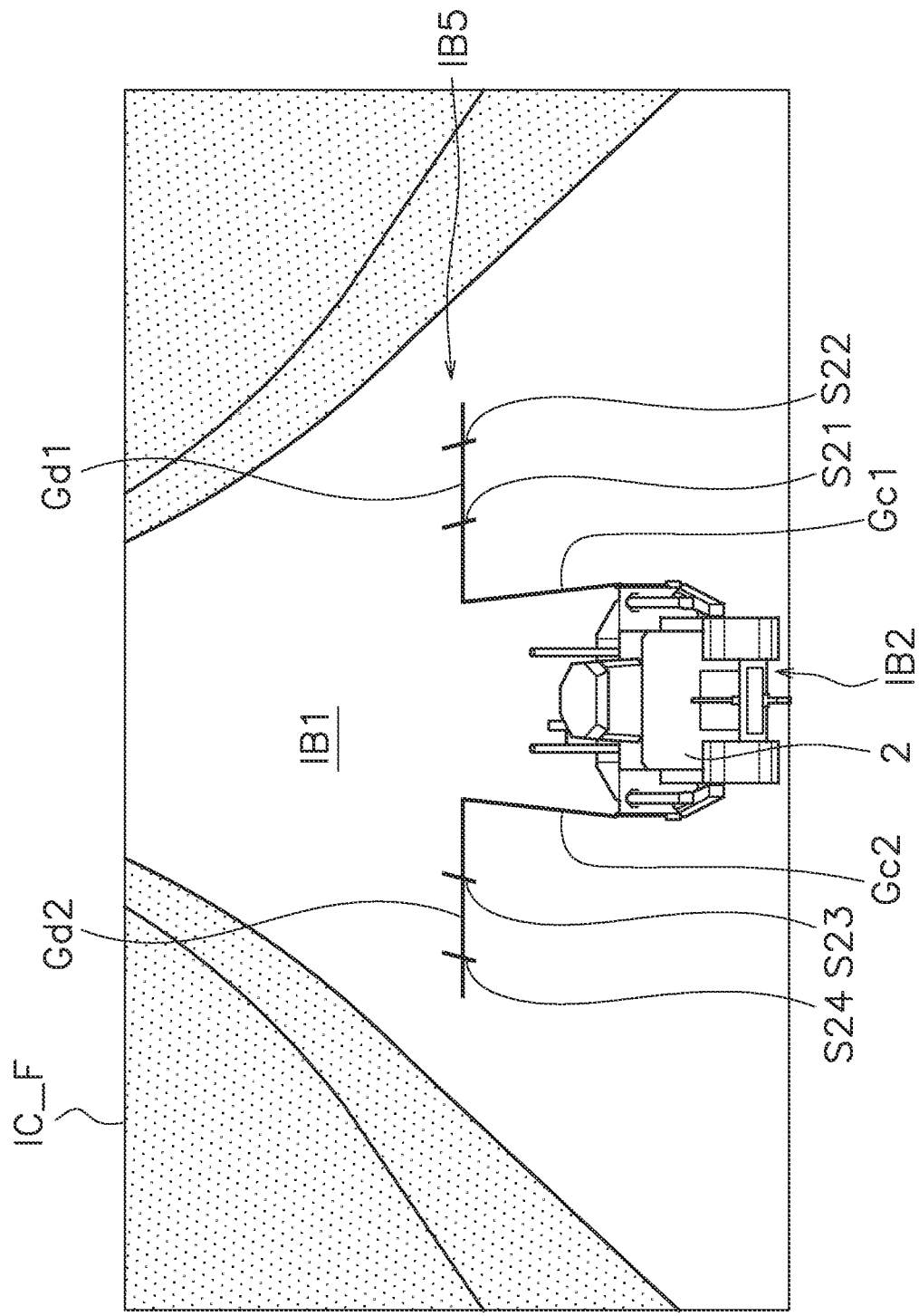
FIG. 9 illustrates an image during forward travel according to a modified example.

A guide display that is the same as the guide display IB4 during reverse travel may be displayed during forward travel. For example, a guide display IB5 during forward travel as illustrated in FIG. 9 may be displayed on the display 42. The guide display IB5 includes lateral guide lines Gc1 and Gc2, vehicle width guide lines Gd1 and Gd2, and gradations S21 to S24. The lateral guide lines Gc1 and Gc2 are straight lines that extend forward at the sides of the work machine 1. The vehicle width guide lines Gd1 and Gd2 are straight lines that extend in the vehicle width direction of the work machine 1. The lateral guide lines Gc1 and Gc2, the vehicle width guide lines Gd1 and Gd2, and the gradations S21 to S24 are respectively the same as the lateral guide lines Ga1 and Ga2, the vehicle width guide lines Gb1 and Gb2, and the gradations S11 to S14, and a detailed explanation is omitted.

According to the present disclosure, the operator is able to accurately ascertain the positional relationship between the work machine and the surroundings thereof with an image.

The invention claimed is:

1. A system comprising:
    a work machine including a vehicle body and a blade as a work implement attached to the vehicle body;
    a camera that captures a surrounding image in a traveling direction of the work machine;
    a display; and
    a processor communicably connected to the camera and the display, the processor being configured to
        acquire the surroundings image from the camera,
        combine the surroundings image with a guide display that depicts an interval in a vehicle width direction of the work machine to generate an image including the surroundings image and the guide display, the guide display including a guide line that extends from a left end and a right end of the blade, and
        control the display to display the image including the surroundings image and the guide display.

2. A system comprising:
a work machine including a vehicle body and a blade as a work implement attached to the vehicle body;
a camera that captures a surrounding image in a traveling direction of the work machine;
a display; and
a processor communicably connected to the camera and the display, the processor being configured to
acquire the surroundings image from the camera,
combine the surroundings image with a guide display that depicts an interval in a vehicle width direction of the work machine to generate an image including the surroundings image and the guide display, and
control the display to display the image including the surroundings image and the guide display,
the processor being further configured to
acquire attitude data indicative of an attitude of the work machine, and
display the guide display in accordance with the attitude of the work machine.

3. The system according to claim 2, wherein
the attitude data includes a roll angle of the vehicle body, and
the processor is further configured to display the guide display at an angle corresponding to the roll angle.

4. The system according to claim 1, wherein
the processor is further configured to
acquire a position of the work implement and
display the guide display in accordance with the position of the work implement.

5. The system according to claim 1, wherein
the guide line is a vehicle width guide line that extends in the vehicle width direction of the work machine.

6. The work machine according to claim 5, wherein
the vehicle width guide line includes lines that extend outward of both ends of the work implement in the vehicle width direction.

7. The system according to claim 5, wherein
the guide display includes gradations applied at predetermined intervals along the vehicle width guide line.

8. The system according to claim 1, wherein
the guide display includes gradations applied at predetermined intervals along the vehicle width direction.

9. The system according to claim 1, wherein
the processor is further configured to cause the display to display the image including the surroundings image and the guide display during forward travel or during reverse travel of the work machine.

10. The system according to claim 1, wherein
the processor is configured to control the display to update the image in real time as a video while the work vehicle travels in the traveling direction.

11. The system according to claim 1, wherein
the processor is configured to change the guide display in accordance with whether the traveling direction is a forward direction or a reverse direction.

12. A method executed by a processor for displaying, on a display, surroundings of a work machine including a vehicle body and a blade as a work implement attached to the vehicle body, the method comprising:
acquiring a surroundings image in a traveling direction of the work machine from a camera that is communicably connected to the processor;
combining the surroundings image with a guide display that depicts an interval in a vehicle width direction of the work machine to generate an image including the surroundings image and the guide display, the guide display including a guide line that extends from a left end and a right end of the blade; and
displaying the image including the surroundings image and the guide display on the display.

13. A method executed by a processor for displaying, on a display, surroundings of a work machine including a vehicle body and a blade as a work implement attached to the vehicle body, the method comprising:
acquiring a surroundings image in a traveling direction of the work machine from a camera that is communicably connected to the processor;
combining the surroundings image with a guide display that depicts an interval in a vehicle width direction of the work machine to generate an image including the surroundings image and the guide display, the guide display including a guide line that extends from a left end and a right end of the blade;
displaying the image including the surroundings image and the guide display on the display; and
acquiring attitude data indicative of an attitude of the work machine,
the displaying of the image including displaying the guide display in accordance with the attitude of the work machine.

14. The method according to claim 13, wherein
the attitude data includes a roll angle of the vehicle body, and
the displaying of the image includes displaying the guide display at an angle corresponding to the roll angle.

15. The method as in claim 12, further comprising:
acquiring a position of the work implement,
the displaying of the image including displaying the guide display in accordance with the position of the work implement.

16. The method according to claim 12, wherein
the guide line is a vehicle width guide line that extends in the vehicle width direction of the work machine.

17. The method according to claim 12, wherein
the image including the surroundings image and the guide display is displayed on the display during forward travel or during reverse travel of the work machine.

18. A method executed by a processor for displaying, on a display, surroundings of a work machine including a vehicle body and a blade as a work implement attached to the vehicle body, the method comprising:
acquiring a surroundings image in a traveling direction of the work machine from a camera that is communicably connected to the processor;
combining the surroundings image with a guide display including a pair of lateral guide lines that extend forward or rearward from the blade at sides of the work machine to generate an image including the surroundings image and the guide display; and
displaying the image including the surroundings image and the guide display on the display during reverse travel of the work machine.

19. The method according to claim 18, wherein
the pair of lateral guide lines each extend rearward from positions indicative of both ends of the blade in the vehicle width direction.

20. The method according to claim 18, wherein
the guide display further includes a pair of vehicle width guide lines that extend outward in the vehicle width direction from the pair of lateral guide lines.

21. A system comprising:
a display; and
a processor communicably connected to the display, the processor being configured to
   acquire a surroundings image in a traveling direction of a work machine from a camera that is communicably connected to the processor,
   combine the surroundings image with a guide display that depicts an interval in a vehicle width direction of the work machine to generate an image including the surroundings image and the guide display, the guide display including a guide line that extends from a left end and a right end of a blade of the work machine, and
   control the display to display the image including the surroundings image and the guide display.

\* \* \* \* \*